Figure 4:
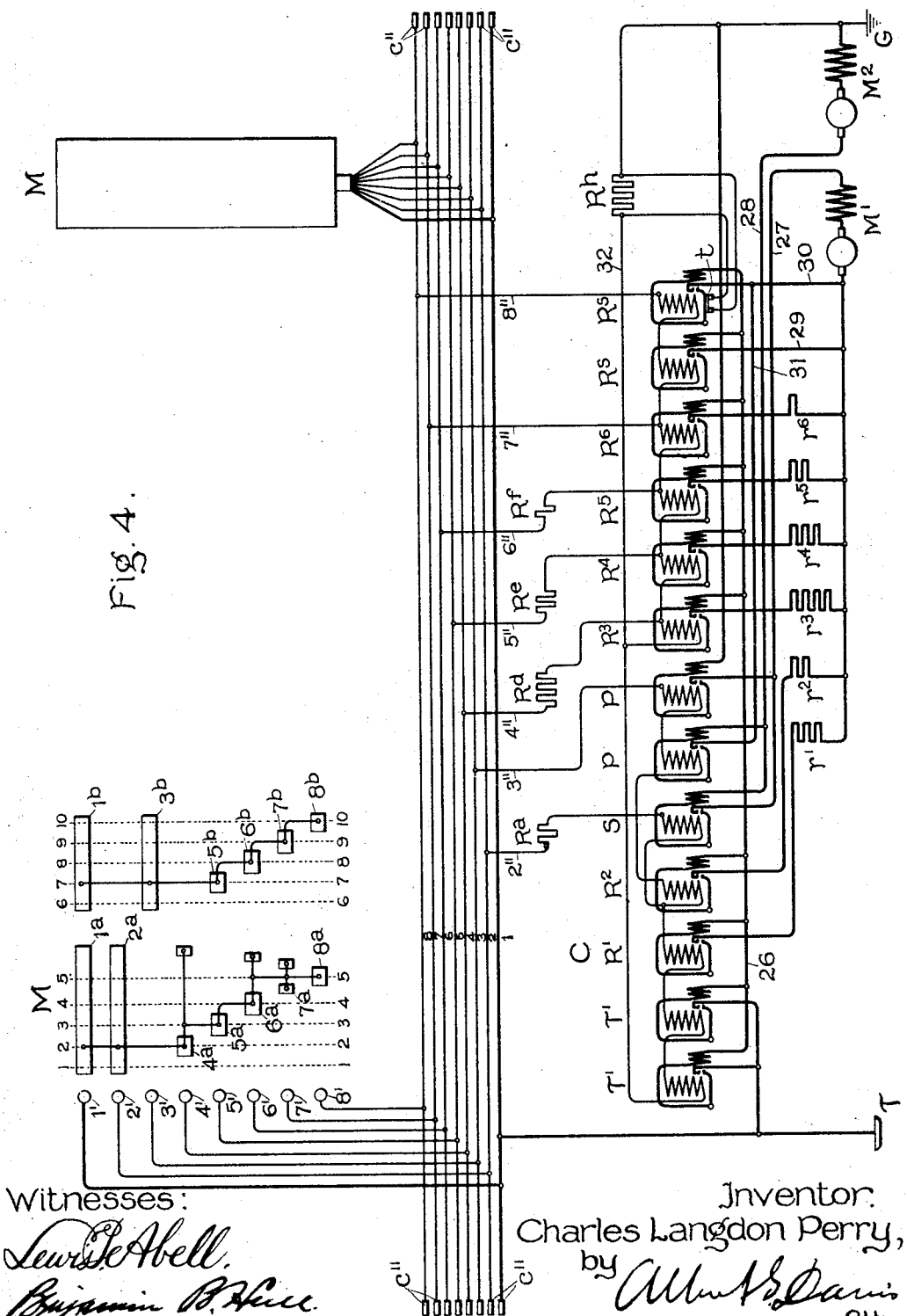

No. 687,060. Patented Nov. 19, 1901.
C. L. PERRY.
SYSTEM OF MOTOR CONTROL.
(Application filed June 21, 1900.)
(No Model.) 4 Sheets—Sheet 1.
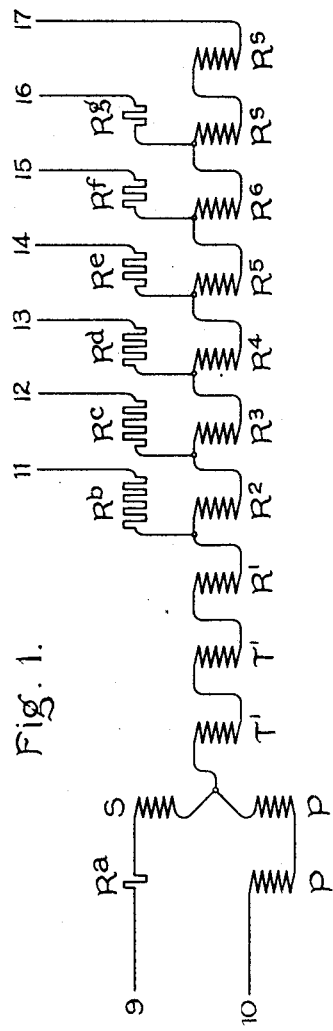
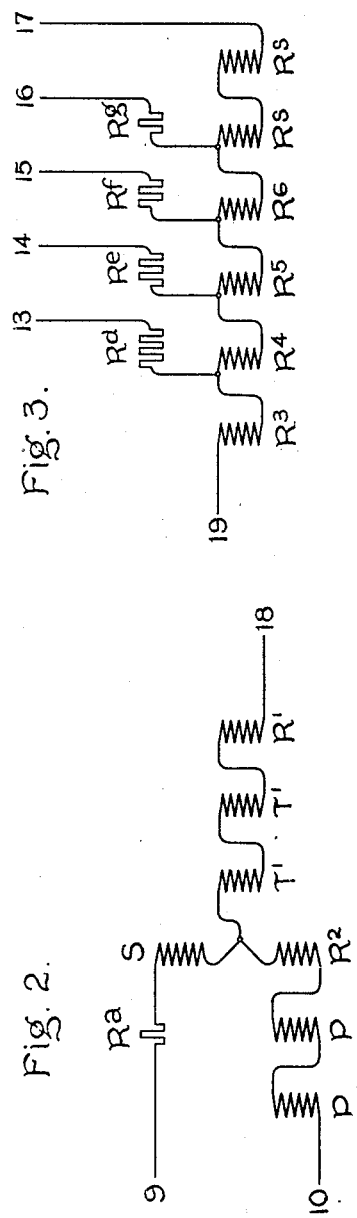
Witnesses:
Inventor:
Charles Langdon Perry
by Albert G. Davis
Atty.

No. 687,060. Patented Nov. 19, 1901.
C. L. PERRY.
SYSTEM OF MOTOR CONTROL.
(Application filed June 21, 1900.)
(No Model.) 4 Sheets—Sheet 2.

No. 687,060. Patented Nov. 19, 1901.
C. L. PERRY.
SYSTEM OF MOTOR CONTROL.
(Application filed June 21, 1900.)

(No Model.) 4 Sheets—Sheet 3.

Witnesses:
Lewis F. Abell.
Benjamin B. Hull.

Inventor:
Charles Langdon Perry
by Albert G. Davis
Atty.

No. 687,060. Patented Nov. 19, 1901.
C. L. PERRY.
SYSTEM OF MOTOR CONTROL.
(Application filed June 21, 1900.)
(No Model.) 4 Sheets—Sheet 4.

Witnesses:
Lewis P. Abell.
Benjamin B. Hull.

Inventor:
Charles Langdon Perry,
by Albert G. Davis
Atty.

United States Patent Office.

CHARLES LANGDON PERRY, OF SCHENECTADY, NEW YORK, ASSIGNOR TO GENERAL ELECTRIC COMPANY, A CORPORATION OF NEW YORK.

SYSTEM OF MOTOR CONTROL.

SPECIFICATION forming part of Letters Patent No. 687,060, dated November 19, 1901.

Application filed June 21, 1900. Serial No. 21,082. (No model.)

*To all whom it may concern:*

Be it known that I, CHARLES LANGDON PERRY, a citizen of the United States, residing at Schenectady, county of Schenectady, State of New York, have invented certain new and useful Improvements in Systems of Motor Control, (Case No. 1,593,) of which the following is a specification.

My invention relates to a motor-control system employing motor-controllers comprising a plurality of separately-actuated contacts.

It has for its main object to so organize such a system that the actuating-coils of the various controller contacts or switches may be efficiently operated at full-line potential; but it also comprises a novel arrangement for reducing the current in the actuating-coils in the "running" positions of the controller.

I have illustrated my invention as applied to a system arranged for the control of the propelling-motors on an electrically-driven vehicle or on a train comprising one or more motor-vehicles, and though it is especially adapted for such use and will be described in such connection it is to be understood that I do not consider my invention limited to such application, but deem it to be of general application in any control system of the character described.

In the systems heretofore devised with which I am familiar the actuating-coils for the separate controller-contacts have been operated in multiple circuits supplied with current from a suitable source, and in practice in order to reduce as much as possible the energy expended in operating the controller-contacts it has been found necessary to employ a source of current-supply of a potential considerably below that of the line or else to limit the flow of current in the control-circuits by making the resistance in each of the circuits very large. Both of these expedients are objectionable in actual practice, the first because it renders necessary the employment on the train of an auxiliary source of electromotive force which must be always maintained, whether or not the train is running, and the second because it demands either an additional resistance in each of the control-circuits, in which energy is continually wasted as long as the coils are supplied with current, or else a high-resistance actuating-coil. The latter alternative is exceedingly objectionable in practice, for not only does it render the coil expensive in construction, but also when the circuit of such a coil is opened a high inductive potential dangerous to insulation and productive of arcing is generated.

In a system arranged according to my invention the actuating-coils for the controller-contacts are so proportioned that a determined number of them may be connected in series in the final positions of the controller directly across the line without the interposition of resistance, the windings of the several coils offering when thus connected a resistance sufficient to limit the current to the amount requisite for their successful operation.

In the first positions of the controller, when but few contacts are required to be actuated, current is supplied to the actuating-coils of those contacts which it is desired shall be operated through a resistance adjusted to limit the flow of current to substantially the same value as when all the coils are in circuit. In the later positions of the controller when it becomes necessary to energize a greater number of actuating-coils current is supplied to the greater number of coils in series with a smaller resistance, the resistance being decreased as each new coil is inserted until finally the requisite number of coils are connected in series without additional resistance. I am thus enabled to operate the controller-contacts from full-line potential by means of actuating-coils having a compact and cheap construction and at the same time to keep the expenditure of energy in the control-circuits at a minimum. My invention also enables me to operate a controller with a less number of conductors in the control system than have heretofore been required.

I have illustrated my invention as applied to a series-multiple controller of the form invented by F. E. Case; but it is evident that it is applicable as well to any controller, whether of the series-multiple or of any other type in which a plurality of separately-actuated contacts are employed.

In the simplest embodiment of my invention the actuating-coils for the several controller-contacts are connected permanently in series in a single circuit branched at one end, so that it may include the actuating-coils of either the series or the parallel contacts, (but not both at the same time;) but in the preferred embodiment the actuating-coils are connected in two separate series, one including the actuating-coils of the trolley-contacts, such resistance-controlling contacts as are to be closed in the first operative positions of the controller and either the series or the parallel contacts, and the other the actuating-coils of the remaining resistance-controlling contacts.

Figure 5:
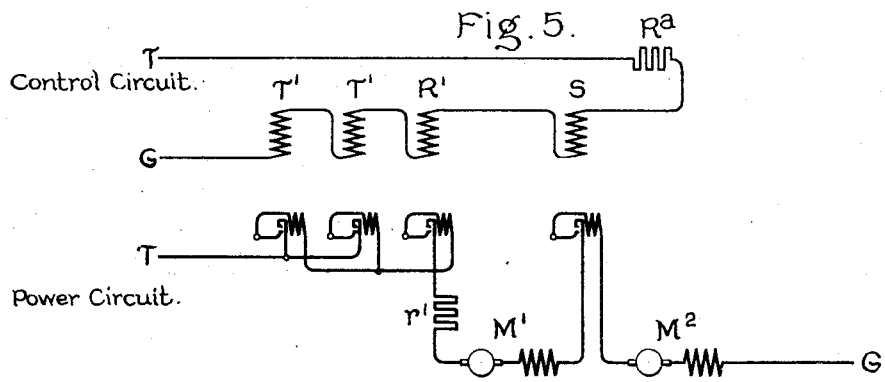
Figure 6:
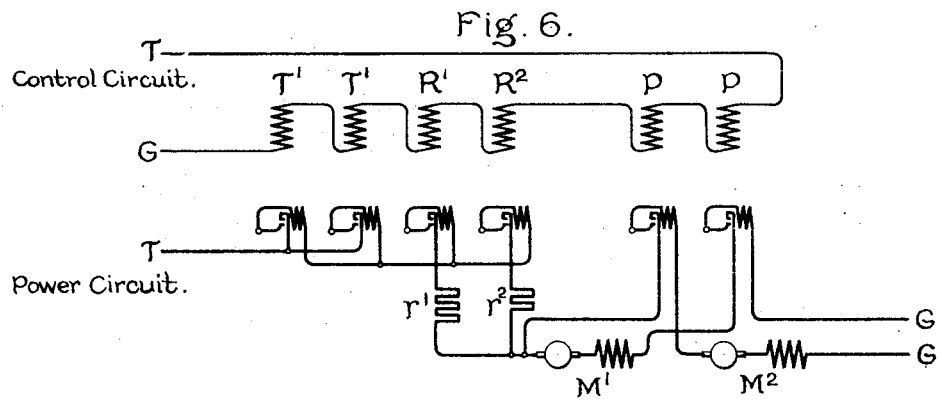
Figure 7:
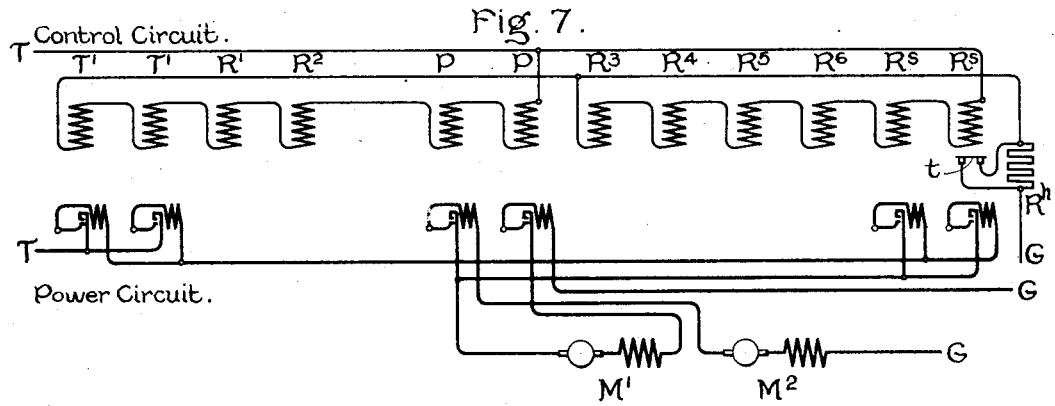
Figure 8:
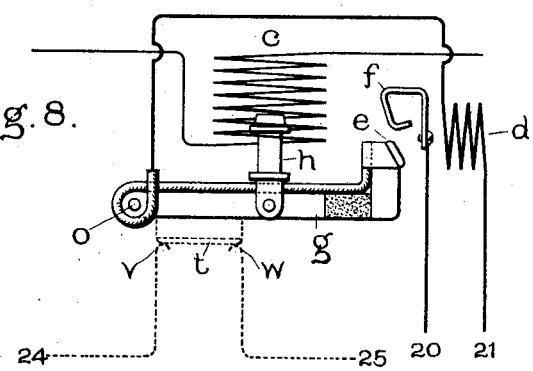
Figure 9:
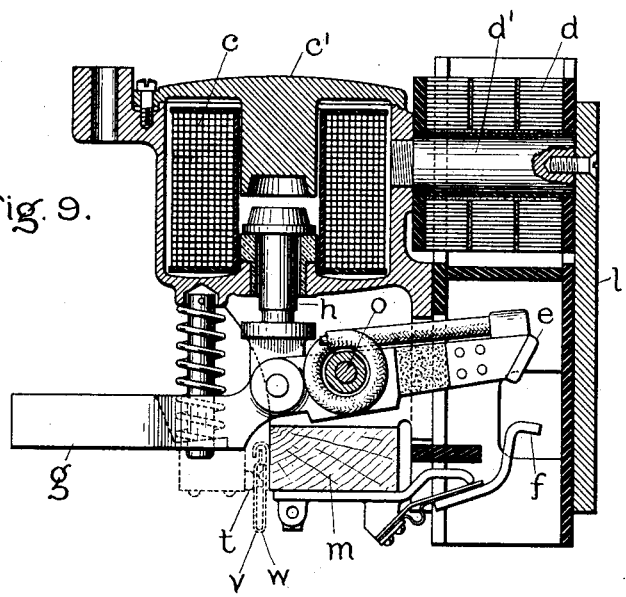

In the drawings annexed to this specification, Figure 1 is a diagram showing controlling-circuits for the actuating-coils of a controller of the separately-actuated contact type arranged according to my invention. Figs. 2 and 3 are diagrams showing a modified system of controlling-circuits. Fig. 4 represents diagrammatically a motor-controller of the separately-actuated contact type operatively connected to a power-circuit, with controlling-circuits arranged according to my invention connected to the same power-circuit through a suitable master-controller. Figs. 5, 6, and 7 are diagrams of the control and power circuits of the motor-controller represented in Fig. 4 for different positions of the master-controller. Fig. 8 is an enlarged diagram of one of the controller-contacts shown in Fig. 4, together with its actuating and blow-out coils; and Fig. 9 is a view in cross-section, showing the complete construction of a form of controller element in connection with which my invention may be employed.

Referring first to Fig. 4 of the drawings, the letters T', T', R', $R^2$, S, P, P, $R^3$, $R^4$, $R^5$, $R^6$, and $R^s$ $R^s$ indicate the various elements of a series-multiple controller C of the separately-actuated contact type. Each of these elements comprises a pair of switch-contacts connected to a power-circuit and an actuating coil or winding for said contacts connected to a controlling-circuit in a manner hereinafter described. As already stated, my invention relates only to the control system for the actuating-coils, the construction and arrangement of the several elements of the controller and the connections of the motor-circuits thereto constituting no part of my invention; but in order that the invention may be clearly apprehended a general description of the controller will be given.

Each of the controller elements shown in Fig. 4 has the general construction indicated in the diagram in Fig. 8, in which $e$ and $f$ represent contacts connected to the power-circuit through the conductors 20 21, the conductor 21 leading through the blow-out winding $d$ to the movable contact $e$, mounted upon the arm $g$, and the conductor 20 leading directly to the fixed contact $f$. The arm $g$ is pivoted at $o$ and has mounted thereon the core $h$ of the actuating-winding $c$. Whenever current is supplied to the actuating-winding, the core $h$ draws up the arm $g$ and closes the power-circuit at the contacts $e f$, and whenever the actuating-winding is de-energized the arm $g$ moves (as shown in the diagram under the influence of gravity) to open the circuits at the contacts $e f$. The parts indicated by dotted lines in this figure comprise a conducting-strip mounted upon and insulated from the arm $g$ and operating to maintain a circuit through the conductors 24 and 25 and the spring-contacts $v$ and $w$ when no current is flowing in the actuating-winding $c$, said circuit being opened whenever the arm $g$ is actuated to bring the contacts $e$ and $f$ into engagement. The dotted-line construction is used in connection with one of the elements $R^s$, and its function will be described in connection with the description of the complete controller.

Returning now to Fig. 4, which shows my system of control suitably arranged for application to a vehicle, which may be one of the units of a train system, M' $M^2$ represent the motors for propelling the vehicle, and C the controller therefor. The numerals 1 to 8, inclusive, represent a system of conductors extending from one end to the other of the vehicle and provided at each end with connecting devices $c''$, by means of which they may be connected to corresponding conductors on the adjacent vehicles of the train. Various control-circuits are connected to the conductors 2 to 8, each leading through certain of the actuating-windings of the controller C to a common conductor 32, the end of which is grounded at G. Current is supplied to the propelling-motors and to the control system through the usual trolley-shoe T, from which conductors lead to the contacts of the elements T' T' of the controller and also to the conductor 1 of the system of conductors. The connection between the conductor 1 and the other conductors of the system to which the various control-circuits are connected is controlled through one of the master-controllers M, located at any desired point on the vehicle or train. Preferably each motor-car is provided with two master-controllers, located one at each end, as indicated in Fig. 4. Of the two master-controllers shown in the drawings the one on the right is indicated in outline only, while the one on the left is shown with its fixed and movable contacts developed on a plane surface in a manner now commonly used in illustrating such a structure. The movable contacts are represented by the two series of rectangles $1^a$ to $8^a$ and $1^b$ to $8^b$, those that are electrically connected being shown connected together by lines. The fixed contacts are represented by the series of small circles 1' to 8', inclusive. In the actual construction now in common use the rectangular contacts are mounted on the surface of a cylinder and are arranged to be rotated past the circular contacts so that in the different operative positions of the controller the fixed contacts will engage the movable contacts along the lines 1 1 2 2, &c.

I have shown in Fig. 4 only such of the parts of a motor-control system as are necessary to render clear the operation of my invention, all auxiliary apparatus being omitted for the reason that if shown it would only tend to confuse the diagram, but in an actual installation reversing - switches would of course be provided in the motor-circuits, control-circuits for such switches would be connected to additional conductors in the system of conductors, and a reversing-switch would be incorporated in the master - controller. The usual cut-out switches and circuit-breakers would also be placed in the various circuits wherever needed.

In general the operation of such a system as is illustrated in Fig. 4, whether or not the control system is arranged according to my invention, is as follows:

When any one of the master - controllers connected to the system of conductors 1 to 8 is moved into its first operative position, with its fixed contacts engaging the movable contacts along the line 1 1, current is supplied to the actuating-windings of certain of the elements of all the controllers whose actuating-windings are connected to the system of conductors, and on each motor-car contacts are actuated to close a circuit from the trolley-shoe T through a suitable resistance and through the motors connected in series to ground. In later positions of the master-controller other contacts are actuated in each controller to connect additional resistances in multiple with the one first inserted, and when all of the resistance-sections have been connected in multiple the next step of the master-controller throws into operation certain controller-contacts, which short-circuit all the resistances, thus leaving the motors connected in series directly across the source of supply. As the master-controller is moved to its next operative position all the actuating-windings are deënergized, and when this position is reached contacts are actuated which connect the motors in multiple with each other and in series with a suitable resistance across the source. In the later positions of the controller the resistance is gradually reduced and then short-circuited, as before, so that in the final position of the master-controller such contacts are actuated in each motor-controller as will connect the motors in multiple directly across the source, with no resistance included in their circuits.

In order that the functions of the different contacts of the motor-controller may be the more readily held in mind, I have lettered the several elements of the controller to correspond with their several functions. Thus the contacts of T' T' operate in multiple to close a circuit from the trolley-shoe to the conductor 26, leading to the motor-circuits, the contacts of the element S operate to connect together the conductors 27 and 28, and thus to connect the motors in series, the contacts of P P operate the one to connect the conductor 27 to the ground and the other to connect the conductor 28 to the conductor 30, thus connecting the motors in multiple, while the contacts of R' to $R^6$, inclusive, operate to cut into the motor-circuit the corresponding sections of resistance $r'$ to $r^6$, and those of $R^s$ $R^s$ to close a circuit directly from the conductor 26 to the conductors 29 and 30, thus short-circuiting all the resistance-sections.

As already stated, it has been heretofore customary to operate such a controller by means of actuating-coils connected in multiple circuits across a suitable source of supply, one or more of said circuits being supplied with current in the first operative position of the master-controller and other circuits being connected in to operate other controller-contacts in the subsequent positions of the master-controller. With such an arrangement not only are there required a large number of conductors in the control system, but also if the actuating-coils of the controller-contacts are to be supplied with current at the same potential as the power-circuit it is necessary in order to reduce to a minimum the expenditure of energy in the control-circuits either to include in each control-circuit a considerable resistance or else to construct the coils themselves with a high-resistance winding. The use of additional resistances constantly maintained in circuit is obviously objectionable. On the other hand, if it is attempted to include the requisite resistance in the coil itself it becomes necessary with the potentials now commonly used in railway systems to construct the coil of such fine wire and with so many turns that it is expensive to wind and so bulky as to materially increase the size and weight of the controller element of which it forms a part. In order to avoid these objectionable features and at the same time to devise a system using a minimum amount of energy at full-line potential to operate the contacts of the controllers, I have devised the system constituting the subject-matter of this application.

Since my invention relates only to the control-circuit, I have illustrated in Figs. 1 to 3, inclusive, the actuating-coils only of the several elements of such a controller, as is illustrated in Fig. 4.

Referring to Fig. 1, which illustrates diagrammatically my invention in its simplest embodiment, the letters S, P, P, T', T', R' to $R^6$, and $R^s$ $R^s$ are placed adjacent to the several actuating-coils in order to indicate their function the same as in Fig. 4. All the actuating-coils are connected directly in series with one another with the exception of those which are required to be actuated only in the series or the multiple positions of the master-controller. These latter coils are arranged in circuits branching from the main circuit containing the rest of the coils, so that current may be supplied to actuate the series element of the controller at the same time with any of the other elements excepting the parallel or to actuate the parallel elements and any of the other elements except the series, but not both the series and parallel at the same time. $R^a$ to $R^g$ represent resistances connected in various control-circuits. In the first series position of the master-controller the contacts of the elements T', T', S, and R' should be operated and in the later positions the contacts of the elements $R^2$ $R^3$ should be operated, while in the first parallel position the contacts of the elements P P T' T' and at least one of the resistance elements should be actuated, and in the later parallel positions the contacts of the remaining resistance elements.

The essence of my invention consists in so arranging the several actuating-coils that in certain positions of the controller a number of them may be connected directly in series across the line, the coils being so proportioned that when thus connected they will take only such an amount of current as is required to operate any one of them. In the other positions of the controller when a less number of controller-contacts are required to be actuated I include in circuit with the coils which are required to be actuated and between them and the source of supply a resistance sufficient in amount to limit the current-flow in said coils to substantially the same amount as would flow when the coils are connected in series.

With the particular arrangement of actuating-coils and control-circuits shown in Fig. 1 the resistance $R^a$ is equal to the resistance of one actuating-coil, $R^b$ to the resistance of seven coils, $R^c$ to the resistance of six coils, and so on, $R^g$ having a resistance equal to that of two actuating-coils. In the first working position of the controller, in which it is required that the contacts of the elements S, T', T', and R' shall be actuated, I connect the terminals 9 and 11 to the two sides of the power-circuit. Current will then flow from one side of the power-circuit through the resistance $R^a$ to the actuating-coils of the elements S, T', T', and R' and through the resistance $R^b$ to the other side of the power-circuit. In the second working position of the controller when it is desired to operate the next resistance-contact one of the connections to the power-circuit will be changed from the terminal 11 to the terminal 12, when current of the same value as before will flow through the resistance $R^a$, the coils of the elements S, T', T', R' and $R^2$, and the resistance $R^c$. In the subsequent series positions of the controller one side of the power-circuit will be connected to one of the terminals 13 to 17, inclusive, smaller and smaller resistance being included in circuit with the coils as more and more actuating-coils are supplied with current, until in the final series position of the controller the entire series of coils S, T', T', and R' to $R^3$, inclusive, are included in a single circuit between the terminals 9 and 17, which circuit secures the operation of all the contacts of the controller (except the contacts of the parallel elements) with the same expenditure of energy as would be required to operate a single controller-contact if the actuating-coils were connected in multiple. For the parallel positions of the controller one side of the power-circuit is connected to the terminal 10, the other side being connected successively to the terminals 11 to 17, as before.

With the arrangement shown in Fig. 1 it is necessary to change the circuit connections at both ends of the controlling-circuit in order to secure the desired operation of the controller. If, therefore, these changes are to be made at the contacts of a single switch or master-controller, it will be necessary to have certain of the contacts of the switch or controller connected to one side of the power-circuit and the rest of the contacts connected to the other side of the power-circuit. Such an arrangement of contacts is in practice undesirable, since it brings the two sides of the system into connection with contacts which are located in close proximity to each other. Therefore in the preferred embodiment of my invention the series of actuating-coils shown in Fig. 1 are divided at $R^3$ into two distinct sets, as shown in Figs. 2 and 3. When thus connected, the actuating-coils are so wound that they have a higher resistance, and for the particular arrangement shown in Figs. 2 and 3 they are so wound that six of them connected in series will take only sufficient current to successfully operate any one of them. With this arrangement the terminals 18 and 19 may be permanently connected to one side of the power-circuit—that is, in a railway system employing a grounded return they may be permanently grounded—while the remaining terminals 9 10 and 13 to 17, inclusive, may be connected at proper times to the other side of the circuit—that is, to line in a railway system—through the contacts of a master-controller.

Supposing the terminals 18 and 19 to be permanently connected to ground, if the terminal 9 is connected to line current will be supplied to the actuating-coils of the elements S, T', T', and R' through a resistance $R^a$, proportioned to equal the resistance of two actuating-coils, and the controller-contacts will be closed to connect the motors in series with a maximum resistance included in their circuit. If, however, instead of connecting the terminal 9 to line the terminal 10 is thus connected, current will be supplied to the actuating-coils P, P, $R^2$, T', T', and R' in series and the controller-contacts will be actuated to connect the motors in multiple in circuit with the maximum resistance for the multiple connection, the resistance element $R^2$ in the arrangement shown being brought into action only when the motors are connected in multiple. Whether the motors are connected in multiple or in series a further reduction of the resistance in circuit with the motors and finally its complete removal is secured by successively connecting the terminals 13 to 17, inclusive, to line. When the terminal 13 is connected to line, current is supplied to the actuating-coil of the element $R^3$ through a resistance $R^d$, proportioned to equal the resistance of five actuating-coils. When the terminal 14 is connected to line, current is supplied to the actuating-coils of the elements $R^3$ and $R^4$ in series with a resistance $R^e$, proportioned to equal the resistance of four actuating-coils, and so on, until when the terminal 17 is connected to line the actuating-coils of the resistance elements $R^3$ to $R^s$, inclusive, are connected in series and all the resistances in the motor-circuits are short-circuited.

The control-circuits which are shown in Fig. 4 of the drawings are arranged according to the diagrams shown in Figs. 2 and 3. Referring to Fig. 4, it will be seen that when the master-controller is moved into its first operative position, so that its fixed contacts lie along the line 1 1, a circuit will be closed from the conductor 1, connected to trolley, to the fixed contact 1' of the master-controller by way of cross-connected contacts $1^a$ and $2^a$ to the contact 2', thence by way of conductor 2 to the control-circuit 2'', containing the resistance $R^a$ and the actuating-coils of the elements S R' T' T', this circuit terminating in a conductor 32, which is connected to ground through a normally short-circuited resistance $R^h$, the function of which will be hereinafter described. This circuit corresponds to the circuit between the terminals 9 and 18 in Fig. 2 and is maintained unaltered in all the series positions of the master-controller.

Fig. 5 shows the active elements in both the power and control circuits for this first series position of the controller, the parts belonging to the power-circuit being separated from the corresponding parts in the control-circuit in order to make the illustration clearer.

When the controller is moved to the position 2 2, current will be supplied through the contact $4^a$, cross-connected to the contact 4', thence through the conductor 4 to the control-circuit 4'', which circuit contains the resistance $R^d$ and the actuating-coil of the element $R^3$, and terminates, as did the other control-circuit, in the common conductor 32. When the master-controller is moved to its next operative position, current is supplied through the contact $5^a$ to the contact 5' and through the conductor 5 to the control-circuit 5'', containing the resistance $R^e$ and the actuating-coil of the element $R^4$ in addition to that of $R^3$. In the fourth position of the master-controller current is supplied through the contact $6^a$ to the contact 6' and thence through the conductor 6 to the control-circuit 6'', containing the resistance $R^f$ and the actuating-coil of the element $R^5$ in addition to the coils included in the previous position of the controller. As the controller is moved to its fifth operative position a circuit is momentarily closed through the contact $7^a$ to the contact 7' and through the conductor 7 to the control-circuit 7'', including the actuating-coils of the elements $R^6$ $R^5$ $R^4$ $R^3$, without additional resistance, and in the sixth and last series position of the master-controller current is supplied through the contact $8^a$ to the contact 8' and thence through the conductor 8 to the control-circuit 8'', containing the six actuating-coils of the elements $R^s$ $R^s$ $R^6$ $R^5$ $R^4$ $R^3$. Each of the control-circuits completed in the positions of the master-controller from 2 2 to 5 5 corresponds to one of the control-circuits indicated in Fig. 3. It will be noted, however, that the resistances are somewhat differently proportioned and that in the control-circuit containing only four actuating-coils no resistance at all is included. This is for the reason that the master-controller is so constructed that one circuit is made before the previous circuit is broken, and such an arrangement necessitates such a proportioning of the resistances that at the time when the new control-circuit is closed and before the control-circuit previously made is broken the new actuating-coil included in the circuit will receive an amount of current sufficient to successfully operate it and substantially the same as will flow when the first coil is supplied with current. When the resistances are thus proportioned, they decrease at a greater rate than is shown in Fig. 3, and it becomes necessary to omit entirely the resistance $R^g$.

In the multiple position of the master-controller of Fig. 4 when the fixed contacts lie along the line 6 6 the circuit through the actuating-coil of the element S is broken, and in its place there is substituted the control-circuit 3'', current passing from the conductor 1 to the contact 1' of the master-controller and thence through the cross-connected contacts $1^b$ and $3^b$ to the contact 3' and by way of conductor 3 to the control-circuit 3'', which circuit contains six coils of the elements P P $R^2$ R' T' T', this circuit being the same as that contained between the terminals 10 and 18 in Fig. 2.

Fig. 6 shows the active elements in both the power and control circuits for this first multiple position of the controller, the parts belonging to the power-circuit being separated from the corresponding parts in the control-circuit in order to make the illustration clearer. In the subsequent positions of the master-controller this circuit is maintained, the control-circuits 5'', 6'', 7'', and 8'' being successively closed as the controller is operated.

Fig. 7 shows in a view similar to Figs. 5 and 6 the control and power circuits for the final multiple position of the controller. In the control-circuit all of the elements which are in operation in this position of the controller are indicated; but in the power-circuit those elements which simply operate to connect in resistances which are short-circuited as soon as the elements R³ R³ are brought into operation are omitted.

In Fig. 9 I have shown in cross-section an actual construction of one of the elements of the controller diagrammatically illustrated in Figs. 4 and 8. In this figure, $e$ and $f$ represent, as before, the power-circuit contacts. The contact $e$ is mounted on the arm $g$, pivoted at $o$, and is actuated by the core $h$. The actuating-winding $c$ constitutes the winding of an electromagnet of the iron-clad type, having a core $c'$ projecting into proximity with the movable core $h$. The blow-out coil $d$, wound of strip copper, surrounds a core $d'$ and has its magnetic circuit completed through the iron parts surrounding the actuating-winding and a plate 1, of magnetic material, projecting downward, so as to bring the contacts $e$ and $f$ within the magnetic field. Suitable insulating material is arranged to form a chamber or chute surrounding the contacts. The body $m$, of insulating material, carries the fixed contact $f$. A construction which may be used for the parts indicated in dotted lines in Fig. 8 is shown in dotted lines in Fig. 9, the parts being lettered the same as in Fig. 8. With such a construction of the controller element as is shown in Fig. 9 it is evident that in the final series and multiple positions of the master-controller (these being running positions) a much less current will be required to maintain the contacts in their closed position than is required to operate them. I therefore provide in the common connection leading through the conductor 32, Fig. 4, to ground a resistance $R^h$, which is normally short-circuited by auxiliary contacts in coöperative relation with one of the elements $R^s$, these auxiliary contacts being arranged as shown in dotted lines in Figs. 8 and 9. When, therefore, the master-controller is moved either into its last multiple or last series position, in which position the contacts of the elements $R^s$ $R^s$ are actuated, the contacts of one of the elements $R^s$ will in closing operate to open the circuit through the contact-springs $v$ $w$ of the auxiliary device $t$, Fig. 4, thereby introducing the resistance $R^h$ into the common ground connection of the control-circuits, and thus materially reducing the current flowing in said circuits while the controller is maintained in those particular positions.

It has been heretofore customary to provide means for introducing a resistance to limit the flow of current in the control-circuits in the final multiple and series positions of the master-controller; but, so far as I know, I am the first to control the introduction of such a resistance by means of contacts operatively related to one of the controller-contacts. The particular arrangement of the contacts shown in dotted lines in Figs. 8 and 9 constitutes no part of my invention, this arrangement having been used by Case in his controller, although for another purpose.

I have illustrated my invention in Fig. 4 as applied to a controller having a certain definite number of elements operating to control two motors; but it is evident that it is not limited to any particular connections in the motor-circuits nor to any particular number of motors nor even to a controller having elements which perform the functions performed by the elements shown in Fig. 4.

I deem my invention to be applicable to any controller in which a number of actuating-windings are required to be supplied with current in different circuit relations in order to make the required connections which the controller is designed to make. The actuating-windings may be of any desired type and may be operatively connected to the corresponding controller-contacts either directly or indirectly.

What I claim as new, and desire to secure by Letters Patent of the United States, is—

1. In a system for controlling the operation of a plurality of switches, a plurality of actuating-windings for said switches, and means for supplying current to a determined number of said windings in series, or to a lesser number in series with a current-limiting resistance.

2. In a control system, a plurality of actuating-windings permanently connected in one or more series and a plurality of control-circuits, containing suitably-graduated resistances, each of said circuits including a number of windings less than the total number in a series.

3. In combination, a controller provided with separately-actuated contacts, actuating-windings for said contacts, and means for supplying current to a determined number of said windings in series or to a lesser number in series with a current-limiting resistance.

4. In a system for controlling the operation of a series of switches, a plurality of actuating-windings for said switches, one or more control-circuits including a determined number of actuating-windings in series, and other control-circuits including a lesser number of said windings.

5. In combination, a controller provided with separately-actuated contacts, actuating-windings for said contacts permanently connected in one or more series, a plurality of control-circuits, certain of said circuits including all of the windings of a series and others including a number of windings less than the total number in a series, and a master-controller for controlling the connection between said control-circuits and a source of current-supply.

6. In combination, a controller provided with separately-actuated contacts, actuating-windings for said contacts connected in a series branching at one end to include two distinct sets of windings, and means for supplying current to said series through either one of said branches.

7. In a control system for operating a controller of the separately-actuated contact type, actuating-windings for said contacts permanently connected in one or more series, control-circuits, some including all of the windings of a series and others including a less number of windings in series with a properly-proportioned resistance, and a master-controller for controlling the connection between said control-circuits and a source of current-supply.

8. In combination, a motor-controller provided with separately-actuated contacts, actuating-windings for said contacts, a master-controller for controlling the supply of current to the said windings, and means operatively connected to one of the motor-controller contacts for reducing the flow of current through the actuating-windings.

9. In combination, a motor-controller provided with separately-actuated contacts, actuating-windings for said contacts, a master-controller for supplying current to said actuating-windings through a circuit or circuits containing resistance, said resistance being normally short-circuited, and means operatively connected to one of the motor-controller contacts for removing said short circuit.

In witness whereof I have hereunto set my hand this 18th day of June, 1900.

CHARLES LANGDON PERRY.

Witnesses:
BENJAMIN B. HULL,
MABEL E. JACOBSON.